United States Patent [19]
Frush

[11] Patent Number: 5,469,169
[45] Date of Patent: Nov. 21, 1995

[54] RECEIVER FOR BISTATIC DOPPLER RADAR NETWORK

[75] Inventor: Charles L. Frush, Longmont, Colo.

[73] Assignee: University Corporation for Atmospheric Research, Boulder, Colo.

[21] Appl. No.: 158,764

[22] Filed: Nov. 30, 1993

[51] Int. Cl.$^6$ .................................................. G01S 13/95
[52] U.S. Cl. ........................................... 342/26; 342/460
[58] Field of Search ............................. 342/26, 460, 59

[56] References Cited

U.S. PATENT DOCUMENTS

| | | | |
|---|---|---|---|
| 2,637,841 | 5/1953 | Davis et al. | 342/460 X |
| 3,671,927 | 6/1972 | Proudian et al. | 367/94 |
| 3,720,949 | 3/1973 | Richter | 342/26 |
| 3,725,914 | 4/1973 | Davidson et al. | 342/26 |
| 3,735,333 | 5/1973 | Balser et al. | 342/26 X |
| 3,795,911 | 3/1974 | Hammack | 342/106 |
| 3,831,751 | 6/1974 | Loos | 342/59 |
| 3,896,382 | 7/1975 | Magenheim | 342/26 X |
| 4,138,660 | 2/1979 | Hill | 342/460 X |
| 4,219,887 | 8/1980 | MacCready, Jr. | 367/90 |
| 4,463,357 | 7/1984 | MacDoran | 342/460 |
| 4,481,517 | 11/1984 | Brown | 367/87 X |
| 4,613,938 | 9/1986 | Hansen et al. | 364/420 |
| 4,792,806 | 12/1988 | Bent et al. | 342/465 |
| 4,841,304 | 6/1989 | Richard et al. | 342/460 |
| 4,866,450 | 9/1989 | Chisholm | 342/410 |
| 4,918,609 | 4/1990 | Yamawaki | 364/449 |
| 5,049,886 | 9/1991 | Seitz et al. | 342/26 |
| 5,198,819 | 3/1993 | Susnjara | 342/26 |
| 5,202,690 | 4/1993 | Frederick | 342/26 |
| 5,235,341 | 8/1993 | Effland et al. | 342/460 |
| 5,252,980 | 10/1993 | Gray et al. | 342/59 |
| 5,278,568 | 1/1994 | Enge et al. | 342/367 |
| 5,313,457 | 5/1994 | Hostetter et al. | 370/18 |
| 5,323,322 | 6/1994 | Mueller et al. | 342/357 X |
| 5,379,320 | 1/1995 | Fermandes et al. | 375/1 |
| 5,382,958 | 1/1995 | FitzGerald | 342/386 |

OTHER PUBLICATIONS

Richard J. Doviak; et al.; Bistatic Radar Detection of the Melting Layer; Journal of Applied Meteorology, vol. 11, No. 6, Sep. 1972; pp. 1012–1016.
R. K. Crane; Analysis of Data from the Avon–to–Westford Experiment; Technical Report; Massachusetts Institute of Technology; Lincoln Laboratory; Jan. 8, 1973.
C. K. Bovey, et al.; Syncronisation Aspects for Bistatic Radars; Plessey Research Roke Manor UK; pp.
Dunsmore, Michael R. B.; Bistatic Radars; Mar.–Apr. 1989; pp. 53–79.
Robert K. Crane; Bistatic Radar From Rain; IEEE Transactions on Antennas and Propagation, vol. AP–22, No. 2, Mar. 1974; pp. 312–320.
Schoenenberger, J. G., et al.; Principles of Independent Receivers for Use With Co–operative Radar Transmitters; Feb. 1982; The Radio and Electronic Engineer, vol. 52, No. 2., pp. 93–101.
Ramir De Porrata–Dòria i Yagü, et al.; RF Receiver For a Bistatic Radar; Mar. 1994; RF Design; pp. 106–113.
A. Agusaca, et al.; A Pulsed Carrier Recovery Using a Descrete Conception of the PLL; 1992 IEEE Frequency Control Symposium; pp. 492–498.
R. J. Doviak; Comparison of Bistatic and Monostatic Radar Detection of Clear Air Atmospheric Targets; Jan. 1972; AIAA 10th Aerospace Sciences Meeting; AIAA Paper No. 72–175.

*Primary Examiner*—John B. Sotomayor
*Attorney, Agent, or Firm*—Duft, Graziano & Forest

[57] ABSTRACT

A multiple Doppler radar network can be constructed using only one, traditional, transmitting pencil-beam radar and one or more passive, non-transmitting receiving sites. Radiation scattered from the pencil beam of the transmitting radar as it penetrates weather targets can be detected at the receive-only sites as well as at the transmitter. In a bistatic system, the location of targets in Cartesian space can be calculated from the pointing angle of the transmitting antenna and the time between transmission of a radar pulse from the transmitter and detection at a passive receiver site.

16 Claims, 7 Drawing Sheets

RECEIVER FOR BISTATIC DOPPLER RADAR NETWORK

CROSS-REFERENCE TO RELATED APPLICATIONS

This application is related to applications titled "BISTATIC MULTIPLE-DOPPLER RADAR NETWORK", "WIDE-ANGLE MULTIPLE-DOPPLER RADAR NETWORK", "RECEIVER ANTENNA FOR BISTATIC MULTPLE-DOPPLER RADAR NETWORK", all of which are filed on the same date as this application, the descriptions of these related applications being incorporated by reference into the present specification.

FIELD OF THE INVENTION

This invention relates to weather radar systems and, in particular, to a system that uses a plurality of passive, inexpensive receivers located at sites remote from the transmitter to collect data that can be used to identify the presence and locus of two-dimensional and three-dimensional wind fields in a predetermined volume of space.

PROBLEM

It is a problem in weather radar systems to implement an inexpensive system that collects sufficient data to provide accurate weather information to the users. Existing weather radar systems that make use of a single Doppler radar transmitter/receiver produce data indicative of only a radial component of the wind field. The collected radial component data is then used to identify the presence and locus of meteorological phenomena extant in the volume of space that is scanned by the Doppler radar beam. These radial component measurements do not present a highly accurate picture of the weather in the monitored volume since the radial Doppler radar beam cannot measure non-radial components of the wind.

Presently, in order to directly retrieve measurements of the magnitude and direction of three-dimensional winds, at least two, and preferably more, transmitting Doppler radar transceivers must be employed. There are severe limitations with this approach. First, the Doppler radar transceivers cannot possibly simultaneously scan the same region of space throughout a storm volume. Radial velocity measurements from the various radars are therefore taken at different times, and wind field syntheses are contaminated by storm evolution and advection. Second, Doppler radars, with rotating high gain antennas, transmitters, and operators are expensive to build, maintain, and operate. Thus, opportunities for multiple Doppler and overdetermined multiple Doppler wind retrievals are fairly rare. This cost, and the difficulty in coordinating the operation of spatially distant Doppler radar sites have precluded the availability of three-dimensional wind fields as an operational product for use in forecasting and warning of severe weather, initializing mesoscale models, or protecting weather sensitive sites such as airports.

It is impossible for each radar in a monostatic non-rapid-scan transmitting network to sample all locations in space concurrently. Scan strategies can be established so that certain individual regions are examined by three or more radars nearly simultaneously. Yet the constraints of geometry prevent this from being extended to large regions of space unless scanning proceeds in an extremely slow manner. Typically, during coordinated scanning, the difference in sampling time near the ground is small. Unfortunately, differences can grow to three minutes or more aloft. In convective environments, significant storm feature evolution can occur between successive measurements of the same space. Windfield syntheses based on such data are suspect. Volume updates rates in a multiple-Doppler radar network are limited by the most slowly scanning radar. Consequently, rapid-scanning and other exotic and expensive techniques cannot escape this difficulty unless all radars in a network use new methods and/or technology.

An alternative to these monostatic Doppler radar systems is the Doppler radar system which uses a single Doppler radar transmitter in conjunction with a remotely located scanning receiver to obtain wind data within a predefined volume of space. The Doppler radar transmitter transmits a "pencil beam" radar signal which is reflected and scattered by targets located in the predetermined volume. The Doppler radar beam scans the predetermined volume in a defined scan pattern. A radial component of the Doppler radar beam is reflected by targets, with the return (backscattered) signal being received at the scanning radar antenna. Another reflected component of the radar beam is received at the remotely located radar receiver, which has an antenna that scans the predetermined volume in coordination with the scanning radar beam. The two received radar signals are used to construct two-dimensional and/or three-dimensional wind fields. A difficulty with this system is that the coordination of the operation of two scanning antennas and the necessary timing coherence is difficult if not impossible to attain.

There is presently no Doppler radar system that can inexpensively and accurately identify the presence and locus of meteorological phenomena in a predetermined volume of space. Low cost is obtained by sacrificing accuracy. Accuracy of measurements can presently be obtained only by the use of multiple Doppler radar transmitter/receiver installations, each site of which is expensive to implement and operate.

SOLUTION

The above-described problems are solved and a technical advance achieved in the field by the receiver for a bistatic multiple Doppler radar network of the present invention. A multiple-Doppler radar network can be constructed using only one, traditional, transmitting pencil-beam radar and one or more passive, low-gain, non-transmitting receiving sites. Radiation scattered from the pencil beam of the transmitting radar as it penetrates weather targets can be detected at the receive-only sites as well as at the transmitter. In this bistatic system, the location of targets in Cartesian space can be calculated from data that indicates the locations of the transmitting and receiving antennas, the pointing angle of the transmitting antenna and the time between transmission of a radar pulse from the transmitter and detection at a passive receiver site. Surfaces of constant delay time form ellipsoids with loci at the transmitter and receiver sites. To detect the velocity of the targets, the echo signals are analyzed for Doppler shift. In a multiple receiver system, the determined meteorological phenomena presence and locus data from each transmitter-receiver pair are combined to accurately identify the location of the target. There is only one result that translates to the data determined at each receiver and then a unique solution is obtained from the collected data.

The simultaneity of the sampling of individual resolution volumes reduces errors associated with storm evolution. It remains true that evolution occurs during the time associated with a complete volume scan by the transmitter, and in a rapidly evolving convective situation this could be significant. Bistatic networks are, however, uniquely suited to take advantage of new rapid-scanning techniques and phased array transmitters. In a bistatic network, only one expensive radar transmitter need be installed and operated in order to achieve rapid updates of full three-dimensional vector winds in complete volumes.

The extremely low cost of passive bistatic receiving sites and the accuracy of the resultant data makes bistatic networks very attractive when compared to traditional monostatic networks. For the equivalent expense of much less than two monostatic radar transmitters, weather-sensitive sites such as airports can be provided with full three-dimensional vector winds from a one transmitter-ten receiver system. This affordability makes bistatic radar networks practical for a wider range of scientific studies. Aircraft wake vortices of arbitrary orientation could be detected through the use of the combination of upward-looking bistatic receivers and monostatic transmitter/receivers.

DETAILED DESCRIPTION

Figure 1:
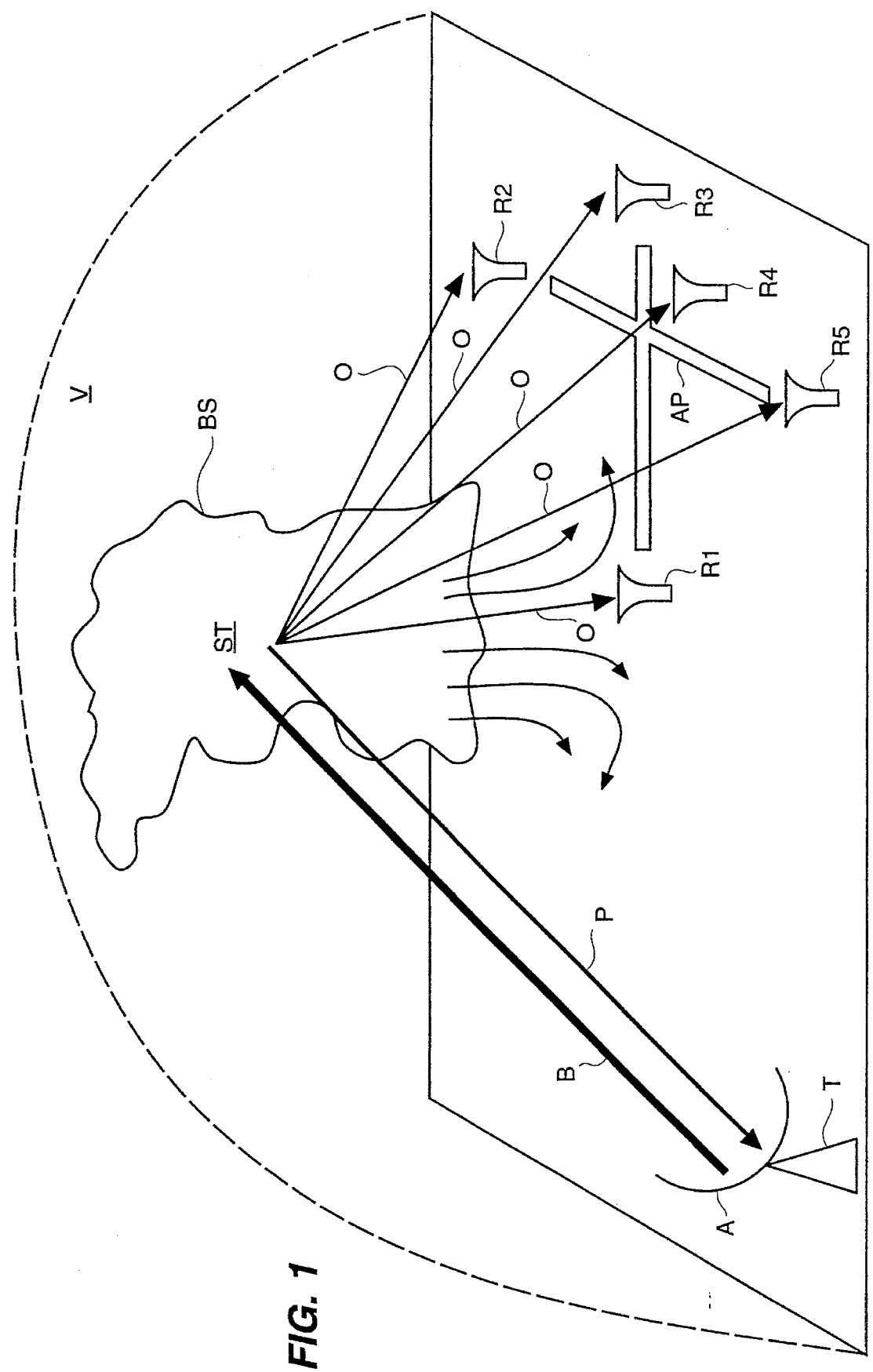
FIG. 1 illustrates in block diagram form the overall architecture of a bistatic radar network.

A multiple-Doppler radar network can be constructed using only one, traditional, transmitting pencil-beam radar and one or more passive, low-gain, non-transmitting receiving sites. Radiation scattered from the pencil beam of the transmitting radar as it penetrates weather targets can be detected at the receive-only sites as well as at the active transmitter. The Doppler Shifts of the radiation received at all the sites can be used to construct vector windfields in a manner similar to that used with traditional radar networks. In a bistatic system, the location of targets in Cartesian space can be calculated from location of the transmitter and receiver antennas, the time-tagged pointing angle of the transmitting antenna and the time between transmission from the active radar and detection at the passive receiver site. Surfaces of constant delay time form ellipsoids with foci at the transmitter and receiver sites. The echo time samples may be correlated to a position along the beam P if the receiving station R is synchronized with the transmitter T and has the pointing angle of the transmitter antenna A and the distance between the transmitter antenna A and the receiver antennas. The pointing angle and the location of the transmitter T define the beam path P, O through the sky relative to the receiver antennas. If the receiver is then time synchronized with the transmission of pulses from the transmitter T and knows the distance between transmitter and receiver antennas, the receiver can then determine the location along beam path P, O where each time sample of the echo signal originated.

There are scientific advantages particular to a bistatic multiple-Doppler network: 1. Radial velocity measurements from individual pulse volumes are collected simultaneously at all the receivers since there is only one source of radiation. 2. The intensity of the obliquely scattered radiation can be compared to Rayleigh scattering predictions and used for hail detection. 3. Rapid scanning of localized weather phenomena can be aided by elimination of the need to scan with multiple scanning radars. This type of radar network also has significant economic advantages. Passive receiver sites contain no high voltage transmitting equipment or large rotating antennas, and they also require no operators and much less maintenance than rotating antennas.

There are shortcomings particular to bistatic radar networks: 1. Passive receiving sites have lower gain antennas (broader field of view) than scanning radar systems and are more sensitive to contamination from transmitter side-lobes and to secondary, or multiple scattering from weather echoes. 2. Lower gain receiving sites are less sensitive to weak weather echoes. 3. Cartesian (u,v,w) windfields derived from bistatic network data exhibit greater error components than those constructed from data from traditional monostatic networks containing equal numbers of radars when advection/evolution are not taken into account. Multiple scattering and side-lobe contamination levels are acceptable in most situations and can be reduced by the use of higher gain (narrower field of view) receiving antennas. The reduced sensitivity and increased error components of the bistatic network can be ameliorated by the use of multiple passive receiver sites, a practical solution due to their very low cost.

System Architecture

The basic architecture of a bistatic multiple-Doppler radar network is illustrated in block diagram form in FIG. 1. The system includes at least one pulsed Doppler radar transmitter T and a plurality of receivers R1–R5, at least one of which is a passive, inexpensive receiver. The pulsed Doppler radar transmitter T generates a "pencil-beam" radar signal that is output, via a highly directional scanning antenna A, into a predetermined volume of space V which may be located in close proximity to or around the Doppler radar transmitter T. The scan pattern of the antenna A can either be the full volume of space around transmitter T or can be selected as a function of the topography around the Doppler radar transmitter site and the volume of interest V. The Doppler radar transmitter T can be of conventional design, such as the NEXRAD WSR88D or NCAR's CP-2 or other well-known scanning pulsed Doppler radar systems. The transmitted radar beam P, consisting of a series of radio frequency pulses, is reflected off targets (scatterers) ST located in the predetermined volume V. One component B of the reflected radar beam (backscattered) is received by the scanning antenna A of the Doppler radar transmitter T, while other components O of the reflected radar beam (obliquely scattered) are detected by the passive receivers R1–R5.

As illustrated in FIG. 1, the volume of interest V is sited above and around an airport AP so that meteorological phenomena BS in this volume V that may impact airport operations can be detected. The radar transmitter T is typically located at a site somewhat distant from the airport AP so that the scan pattern of the scanning radar antenna A is reduced from a full semi-spherical pattern to a narrow segment of a sphere. This reduced scan pattern enables the radar beam P to more frequently probe the volume V. The transmitted radar beam P that is scattered off various targets ST in the volume V must be detected by a number of receivers R1–R5 in order to obtain an accurate determination of the three-dimensional motion of the meteorological phenomena. A single receiver obtains only partial information since the radially transmitted beam ST cannot identify any motion components that are orthogonal to the radial direction of transmission. The passive receivers R1–R5 are located at sites remote from the Doppler radar transmitter T site. There are typically a plurality of passive receivers R1∝R5 associated with a Doppler radar transmitter T to provide good areal coverage and to resolve the limited information obtained from the radial radar beam ST. Their siting is a function of topography of the region and the accuracy of the measurements that are desired.

Figure 2:
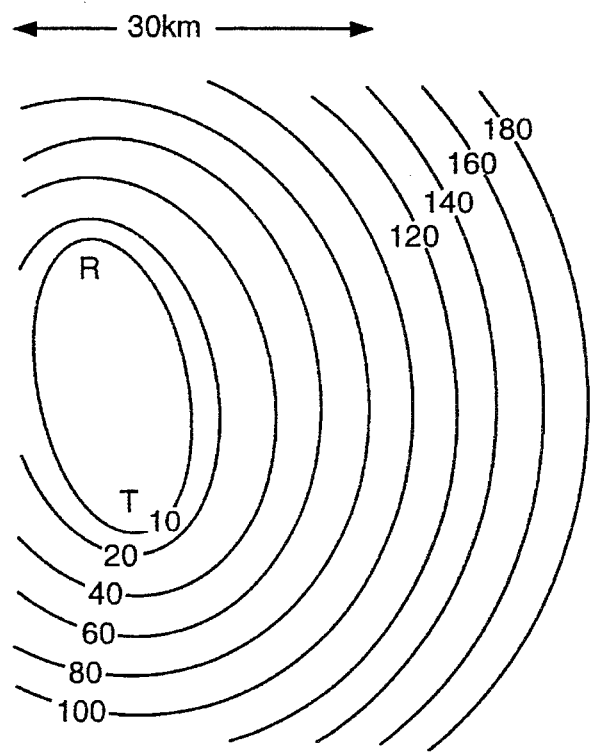
FIG. 2 illustrates a set of constant delay time surfaces that are found by the radar beam around a transmitter site and receiver site pair.

In a bistatic Doppler radar system, the location of a scatterer ST in Cartesian space can be calculated from the time-tagged pointing angle of the transmitting antenna A and the time between transmission of a radar pulse from the radar transmitter T and detection of the reflected radar pulse at the passive receiver site. Surfaces of constant delay time form ellipsoids with foci at the transmitter site and the receiver site, as illustrated in cross-section view in FIG. 2 for a short-baseline system. The location of a scattering particle ST in the volume V, relative to the transmitter site, is specified by:

$$x = \frac{(ct)^2 - D^2}{2[ct - D\cos(p)]} \sin(a)\cos(e)$$

$$y = \frac{(ct)^2 - D^2}{2[ct - D\cos(p)]} \cos(a)\cos(e)$$

$$z = \frac{(ct)^2 - D^2}{2[ct - D\cos(p)]} \sin(e)$$

Figure 3:
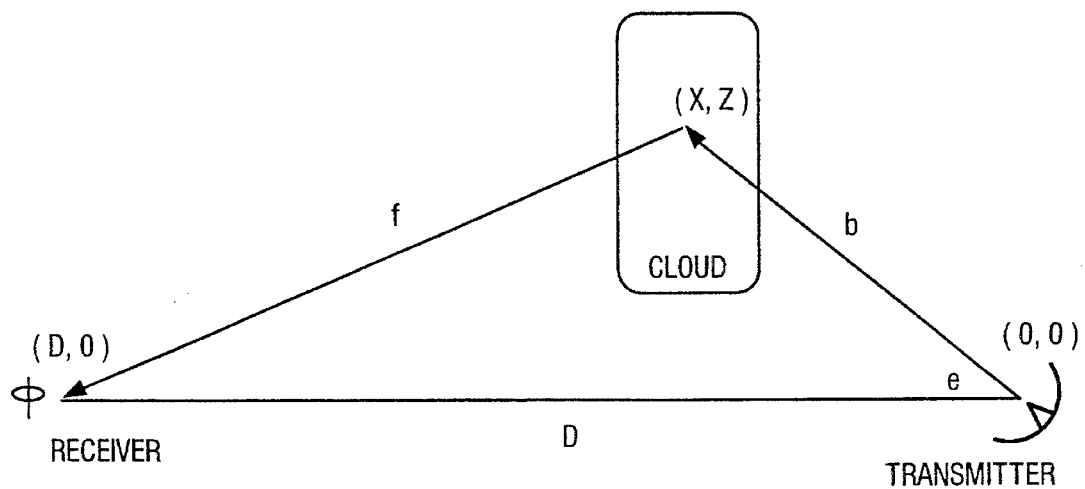
FIG. 3 illustrates the path geometry for directly transmitted and reflected radar pulses.

(1)

where p is the angle enclosed by the transmitter-particle and transmitter-receiver vectors, C is the speed of light, D is the distance between the transmitter site and the receiver site, and a and e are the azimuth and elevation angles relative to the transmitting radar antenna A. This formulation is illustrated schematically in FIG. 3 for the two-dimensional case (y=0). In this simplified case the angle p is equal to the elevation angle of the transmitter antenna A.

In bistatic radar systems, the length of effective radar resolution volumes [roughly proportional to ∂ (range along the transmitted beams)/∂ (delay time)] are not constant. This can be seen easily by contrasting the arrival time of radiation scattered from transmitted beams P directed toward and away from the bistatic receiver along the transmitter-receiver baseline. All radiation scattered forward toward the receiver site arrives at the receiver simultaneously, regardless of the scatterers' locations along the beam P (all pathlengths are identical). In contrast, radiation backscattered toward the Doppler radar transceiver T is delayed by one microsecond for each 150 meter change in scatterer placement along the baseline. In this case, the effective length of resolution volumes is the same as that for a traditional monostatic weather radar. The same result occurs if the scatterers ST are off the baseline but are extremely distant from the bistatic radar network. At most transmission angles, near the bistatic couplet, but away from its baseline, the resolution-volume length is expanded by factors ranging from 1 to 4.

The reflectivity-weighted particle velocity can be retrieved at any point by solving the system of equations:

$$VR_i = u \sin(a_i)\cos(e_i) + v\cos(a_i)\cos(e_i) + w_p \sin(e_i), \quad i=1, n \quad (2)$$

where $VR_i$ are the radial velocities measured by the n radars, $a_i$ and $e_i$ are the azimuth and elevation angles of the n radars, and u, v, $w_p$ are the Cartesian components of the particle velocity field. In dual-Doppler analyses the vertical air-parcel velocity $w_a$ is obtained through the integration of mass continuity. If measurements are available from more than three radars, and a reflectivity-terminal velocity relationship is assumed, the system of equations is overdetermined and can be solved by minimizing error.

Bistatic Wind Field Synthesis Equations

Equation (2) can be modified to apply to a Doppler network consisting of one radar transmitter T and one or more passive bistatic receivers R1–R5 as shown by the matrix equations illustrated in Appendix A. In Appendix A, $VR_i$ are the particle velocities perpendicular to the ellipsoidal constant phase surfaces calculated from the Doppler-shifted radiation at the n bistatic receiver sites R1– R5, $a_i$ and $e_i$ are the azimuth and elevation angles of the illuminated volume relative to the n passive receiving sites, $VR_t$ is the radial velocity calculated at the transmitting radar T, and $a_t$ and $e_t$ are the time-tagged pointing angles of the transmitting antenna A. Equation (3) for a three-receiver network can be solved for (u, v, $w_p$) as shown in Appendix B. The overdetermined cases can be solved similarly by minimizing error.

Using the location of both the transmitter antenna A and receiver antenna S, the location of the target as defined by these variables can be determined when the radar echoes are received.

Accuracy

The variance and standard deviations of the estimates of (u, v, $w_p$) in the three-radar network are expressed by:

$$\frac{1}{\sigma^2}\begin{bmatrix} \alpha_t^2 & \beta_1^2 & \gamma_1^2 \\ \alpha_2^2 & \beta_2^2 & \gamma_2^2 \\ \alpha_t^2 & \beta_t^2 & \gamma_t^2 \end{bmatrix}\begin{bmatrix} \sigma_{VR_1}^2 \\ \sigma_{VR_2}^2 \\ \sigma_{VR_t}^2 \end{bmatrix} = \begin{bmatrix} \rho_u^2 \\ \rho_v^2 \\ \rho_{w_p}^2 \end{bmatrix}. \quad (3)$$

Typical standard deviations in bistatic radar networks are twice that of monostatic radar networks consisting of comparable numbers of radars. Since the cost of bistatic radar receiving sites is very low, less than one-thirtieth of that of conventional transmitters, it is practical to deploy many passive receivers in a typical bistatic radar network. In this fashion, accurate wind fields can be retrieved at a much lower cost than with traditional systems. A ten receiver bistatic radar network provides comparatively accurate wind field synthesis. The vertical particle velocities are determined accurately down to elevations below 2 km, allowing mid-level and low-level boundary conditions to be applied to the downward integration of mass continuity, thus avoiding common problems associated with the establishment of ground-level boundary conditions. The cost of such a radar network is less than that of a two monostatic transmitter radar network.

In the Rayleigh limit, the intensity of the radiation scattered obliquely from a transmitted radar beam varies with the scattering angle measured relative to the transmitted E vector such that $I \propto I_0 \sin^2(\theta)$, where I is the intensity of the scattered radiation, $I_0$ is the intensity of the incident radiation, and $\theta$ is the angle between the incident E vector and the propagation vector of the scattered radiation. In addition, the bistatic geometry affects the size and shape of the resolution volumes as noted above. Therefore, modified versions of the traditional radar equation must be used. This angle-dependent scattering intensity strongly impacts the usefulness of bistatic radars and the choice of appropriate transmitter and receiver sites. If horizontally polarized radiation is transmitted, then there is a circular region at ground level from which there is very little scattering toward a particular receiver. This region is the locus of all points from which the E vector of transmitted beams points at the receiver.

The use of vertical polarization in the radar beam P moves the low-sensitivity notch from the ground level to a vertical plane over the transmitter-receiver baseline. Bistatic systems that employ circular polarization have no low-sensitivity notch. While not nearly as sensitive as a traditional monostatic weather radar, the displayed bistatic configuration, using vertically polarized transmissions, provides a minimum sensitivity of 0–10 dBZ within the useful multiple-Doppler lobes and below −5 dBZ within 4 km of the receiving site. This is adequate for most purposes, but applications that require extreme sensitivity need to use higher-gain receiving antennas, say 25 dB, shorter transmitter-receiver baselines, or multiple receiver configurations to achieve sensitivities below −15 dBZ.

Frequency Coherence

In order to accurately determine the velocities perpendicular to the bistatic radar network's ellipsoidal delay time surfaces from the reflected radar pulses received at the remote bistatic receivers R1–R5, extremely accurate knowledge of the frequency of the transmitted radar pulses must be available. Errors of just 3 Hz result in velocity errors of approximately 0.15 m s$^{-1}$ (assuming 0.1-meter transmissions and ignoring the expansion of the frequency-velocity relationship near the transmitter-receiver baselines). This corresponds to a relative frequency error of only one part in $10^9$. Traditional radar frequency sources, while extremely stable over typical transmit-receive delay times, may drift by much more than this over the longer term. Solutions to this frequency coherence problem include the use of atomic frequency standards at the transmitter T and the receivers R1–R5, direct detection of the frequency of the transmitted pulses through sidelobe coupling or signals sent to the receivers R1–R5 through cables or the atmosphere, and the use of one common frequency standard for the transmitter T and receivers R1–R5.

Timing Coherence

In order to determine the location of resolution volumes accurately, the precise time of the transmission of the radar pulses from transmitter T must be known at all of the receivers R1–R5. To achieve suitable accuracy, this timing must be known within approximately 100 ns. This is particularly true near the transmitter-receiver baselines where effective resolution volumes are expanded.

There are several approaches to meeting this timing coherence requirement, falling into two main categories. In the first category, extremely accurate time is kept at both the transmitter T and receivers R1–R5 and data indicative of the pulse transmission time from the transmitter T is sent to all the receivers R1–R5. The information arrives at each receiver R1–R5 well after the obliquely scattered radiation O, but the pulse repetition frequency can be used to correlate the received radiation O with the pulse transmission time. In the second method, the transmitted pulse is detected directly at the receivers R1–R5. This direct radiation, from the existing sidelobes or through radiation beamed intentionally at the remote receiving antennas, always arrives before any scattered radiation and can be used to start a ranging clock.

Atomic clocks can provide extreme timing accuracy but drift relative to each other. Even though accurate within 1 part in $10^{12}$, they tend to drift apart by roughly 100 ns per day and these clocks must be recalibrated frequently. Either as a method of recalibration or as an independent timing method, the arrival time of direct-path radiation from the sidelobes of the transmitter antenna A could be measured. This radiation may be difficult to detect in sheltered locations, thus complicating the accurate calculation of its arrival time.

The preferred method of achieving both timing and frequency coherence is to link the transmitter T and all the receivers R1–R5 to an external timing standard. Both Loran and Global Positioning Satellite (GPS) signals can provide the needed information, but only the GPS signals include time of day information so that the timing coherence can always be maintained without recalibration. Both signals can be used to achieve frequency coherence to well within one part in $10^{10}$ (0.3 Hz at $\lambda=0.1$ m) if disciplined oscillators with high short-term stability are used.

Bistatic Radar Network Implementation

Figure 4:
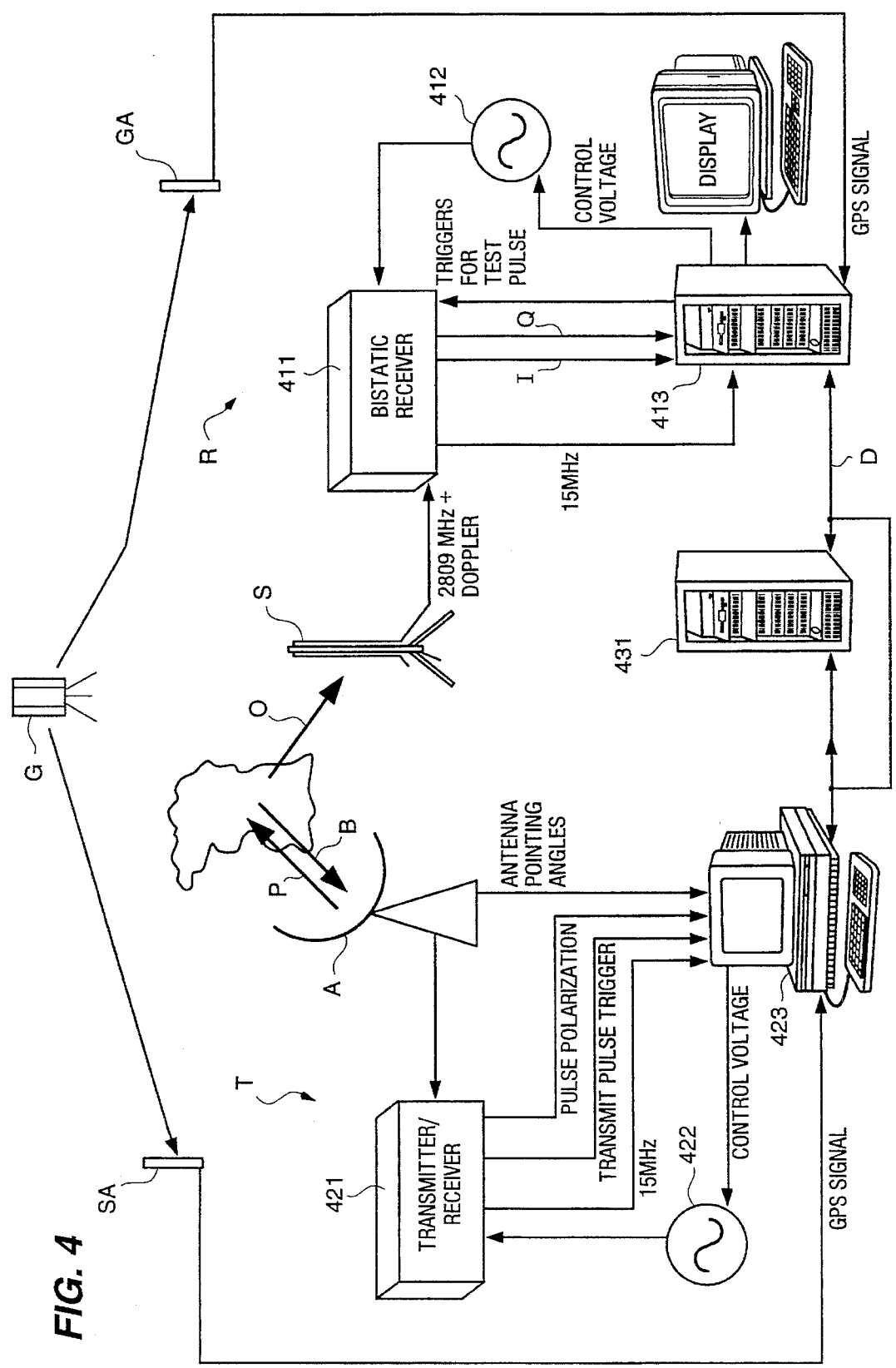
FIG. 4 illustrates in block diagram form additional details of the bistatic radar network.

FIG. 4 illustrates a more detailed implementation of the bistatic radar network. For simplicity of description, only one passive receiver R is illustrated. Pulsed Doppler radar transmitter T scans a predefined volume of space using a stream of radar pulses P transmitted in a radial direction from the antenna A into the volume V. The antenna A follows a precisely controlled scan pattern to sweep all points in the predefined volume V with the radar beam P on a periodic basis. One component B of the radar beam P is backscattered from a scatterer ST to antenna A along the transmit path while a second component O of the transmitted radar beam P is reflected at an oblique angle from the scatterer ST toward receiver R. Receiver R, being a passive element and not steerable, must detect the obliquely reflected component O and reject background noise as well as signals arriving from outside of the predefined volume V, and/or from regions of the predefined volume V that are not monitored by antenna S. In order to enhance the performance of receiver R, a directional antenna S is used to receive signals from only a segment of space, which segment includes all or a portion of the predefined volume V. An excellent choice for the antenna S is a slotted waveguide antenna, which exhibits high gain in a predetermined direction and significantly lower gain elsewhere. The slots are arranged to produce a desired gain pattern which falls off steeply outside of the desired field of view.

The signals received by antenna S consist of base frequency signals (for example 2809 MHz) with the superposition Doppler offset components related to the collective movement of the distributed targets illuminated by transmitter T at a particular location in space. These received signals are coupled to bistatic receiver 411 which is synchronized to the transmitter frequency and pulse transmission time for accuracy of ranging and gating. A precisely controlled oscillator 412 is used as a reference frequency source for bistatic receiver 411. The output frequency of oscillator 412 is controlled by processor 413 which receives reference signals from a number of sources. Timing antenna GA receives timing signals from a source G that is common to all receivers R1–R5 in the bistatic network. An example of such a common timing source G is the Global Positioning Satellites (GPS), which transmit signals of precise frequency. These signals are also time stamped. The received GPS signals are used by processor 413 to discipline oscillator 412 to maintain frequency coherence with the GPS reference, which in turn allows synthesis of signals coherent with transmitter T. The received GPS signals can also be used as a time reference to obtain synchronization with the transmitted radar pulses. A control processor 423 located at the transmitter T also receives GPS timing information and, in the particular example shown, disciplines timing reference oscillator 422 in identical fashion. It also generates data indicative of the time delay between the radar pulse and the GPS timing signals which occur at 1 pulse per second. This data is transmitted to the receiver R via a data link D and used at the receiver R to obtain timing synchronization with the radar pulses. Alternatively, the transmitter T can transmit pulses directly to receiver R in conjunction with the scan beam. In either case, the reference frequency output by oscillator 412 and timing synchronization information from processor 413 are used by bistatic receiver 411 to produce received pulse data I, Q indicative of the in-phase and quadrature components of the received radar echoes. This data and the timing data indicative of the time difference between the transmitted pulse and the received signals represent receiver data that are indicative of the locus of the scatterers. This data is stored in processor 413 and retrieved on a periodic basis by central processor 431, which uses this retrieved data from all the receivers and the time-tagged antenna pointing data to accurately identify the locus of the scatterers. Alternatively, processing can be distributed and processor 413 can perform many of the computation functions described below as performed by central processor 431.

In this particular example, timing antenna TA receives timing signals from a source that is common to all receivers R1–R5 in the bistatic network. An example of such a source is the GPS satellites, which transmit signals of precise frequency. These signals are also time stamped. The received GPS signals are used by processor 423 to discipline oscillator 422 to maintain frequency and timing coherence with the remainder of the bistatic network. The reference frequency output by oscillator 422 and timing synchronization information from processor 423 are used by transceiver 421 to produce the frequency coordinated transmit pulse and received radar echo data I, O, indicative of the in-phase and quadrature components of the received signals. In addition, antenna A outputs antenna pointing angle information regarding the precise direction that the transmitted radar beam P is output by antenna A. This data is stored in processor 423 and retrieved on a periodic basis by central processor 431. Alternatively, processing can be distributed and processor 423 can perform many of the computation functions performed by central processor 431.

The central processor 431 can be connected via data links to all the receivers R1–R5 and transmitter T that form the bistatic network. The data received from these elements represent the information that defines the path of the transmitted radar beam as well as the paths that the received reflected components traversed. The timing information associated with each of the received signals are indicative of the distance of the target from the receivers R1–R5 and transmitter T. This data is used by central processor 431 to compute the locus and motion vectors for the detected target.

Slotted Waveguide Antenna

The slotted waveguide antenna disclosed as the preferred embodiment herein consists of a length of waveguide that is constructed to implement a multi-element antenna which produces a focused receiver pattern to receive signals from only a segment of space (controlled field of view), rather than, for example, an omnidirectional antenna which receives signals from all directions without preference. Slot-antenna arrays have been used in many ground-based and airborne radar systems. Waveguide-fed slot-antenna arrays are used as resonant and travelling wave antennas when precise amplitude and phase control are needed.

The slot is a commonly used radiator in antenna systems. The slot can be incorporated into the antenna feed system, such as a waveguide or stripline system without requiring a special matching network. Low-profile high gain antennas can be easily configured using slot radiators, although their inherent narrow frequency bandwidth can limit antenna performance in some applications. A slot cut into the waveguide wall which interrupts the flow of currents couples power from the waveguide modal field into free space. A singly moded waveguide is normally used for a slotted waveguide array design, and the spacing and/or orientation of the slots along the edge of the waveguide are used in order to control aperture illumination. A travelling waveguide slot array has five significant characteristics: the resonant slots are spaced by either more or less than one-half of the waveguide wavelength; the slotted waveguide should be terminated by a matched load; all slots in the array are resonant at the center frequency; the beam is off broadside and is frequency dependent; array efficiency is less than unity. Travelling wave slot antenna arrays are either uniformly spaced arrays to produce a low sidelobe pencil beam or nonuniformly spaced arrays to produce shaped beam patterns.

Figure 6:
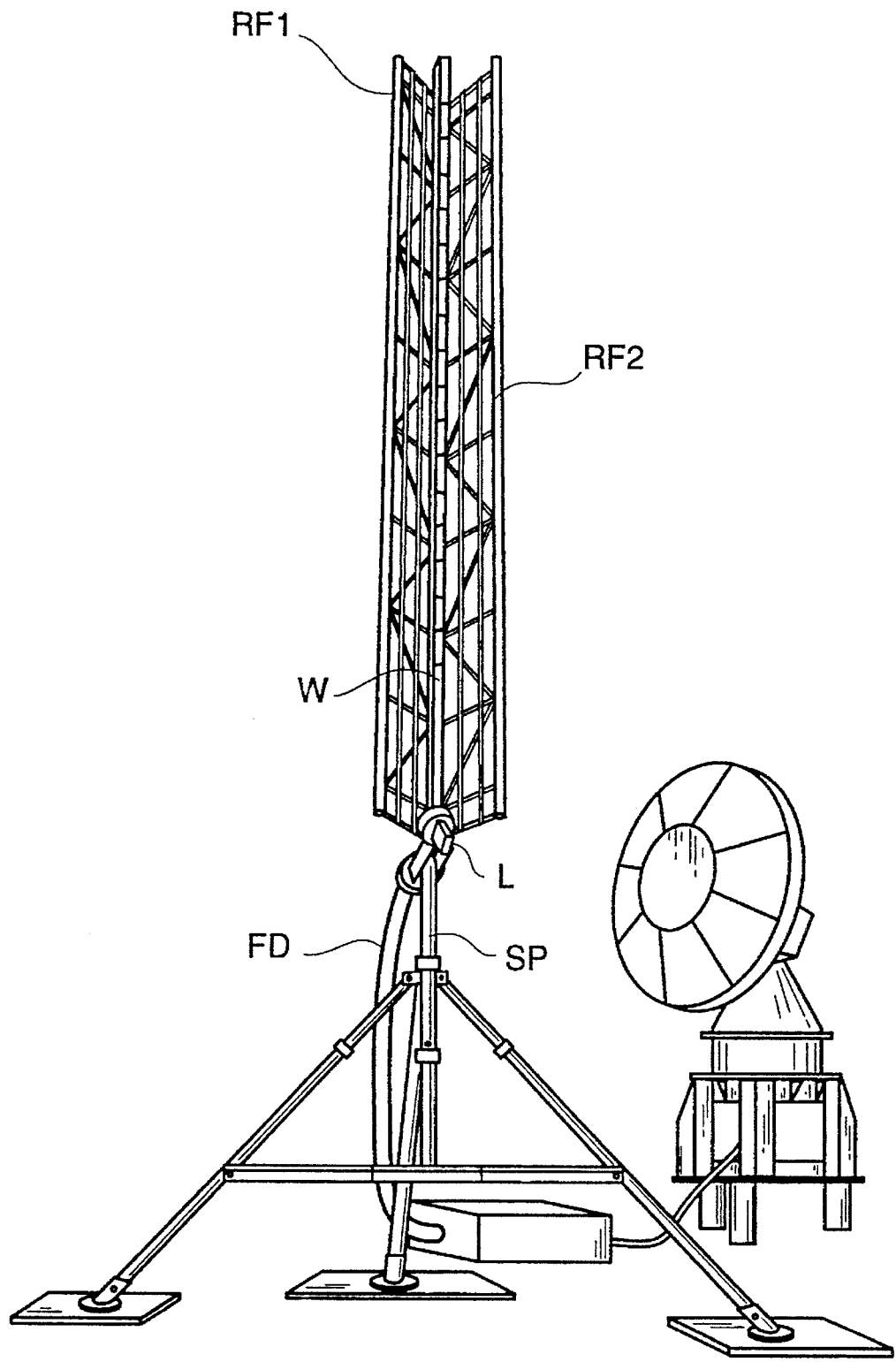
FIG. 6 illustrates a perspective view of a typical passive bistatic radar network receiver antenna.
Figure 7:
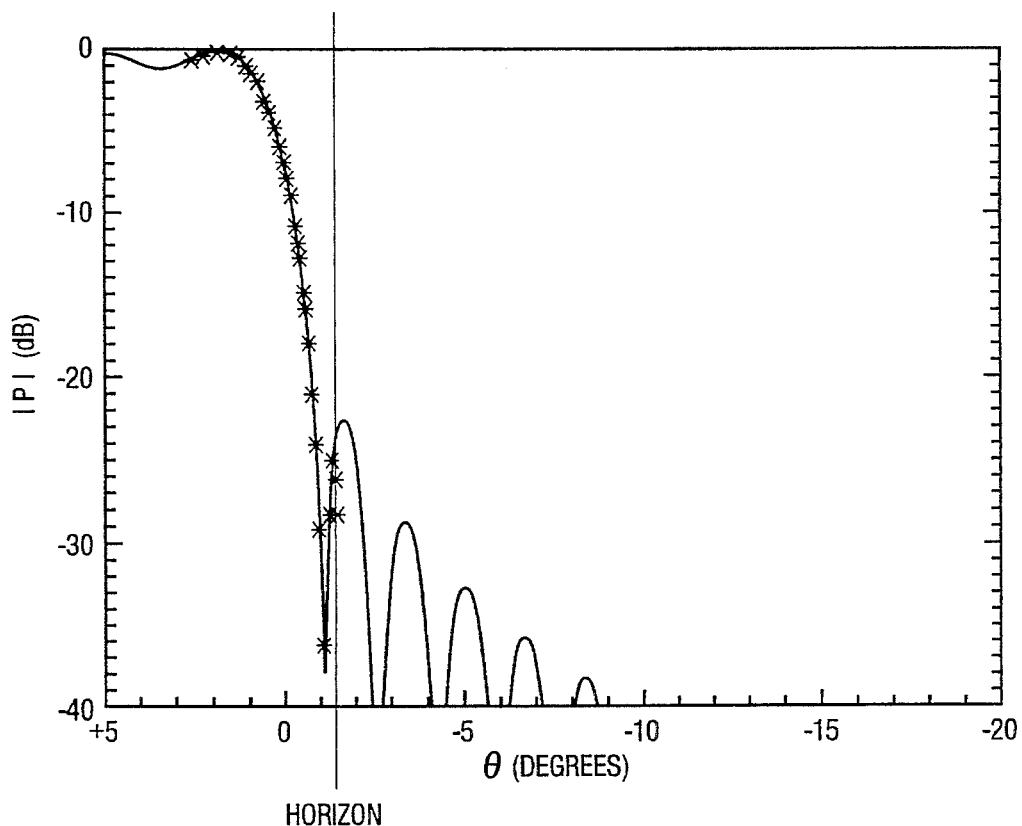
FIG. 7 illustrates the antenna sensitivity pattern for the antenna of FIG. 6.

For the purpose of the preferred embodiment of the bistatic network, the antenna criteria are: a (vertically) polarized beam to match the transmitter radar polarization, a beam pattern that exhibits a sharp reduction in gian for elevation angles above and below the desired field of view, a broad azimuthal pattern and relatively low sidelobes. A preferred pattern has sidelobes of below 20 dB from the horizon down to below the ground, a flat top pattern from the horizon to some selected elevation angle, sidelobes below 20 dB from this elevation angle up to zenith. As an example, too implement this antenna, using a slotted waveguide, a 4 meter long element was constructed using 58 uniformly spaced slots machined therein. The resultant gain is 13 dB and the antenna exhibits an elevation beam width of 20 degrees and an azimuthal beamwidth of approximately 160 degrees. FIG. 7 illustrates the beam pattern of such an antenna. An alternate design, illustrated in FIG. 6, having higher gain can achieve a 4 degree elevation pattern and uses reflectors RF1, RF2 placed on both sides of the waveguide W reduce the azimuth beam pattern to approximately 40 degrees. The implementation illustrated in FIG. 6 is a top fed antenna, so the waveguide FD is simply the input power feed and the segment W represents the active element that contains the precisely machined slots to produce the desired antenna pattern. The segment W of the antenna is terminated by a load L. A support SP is provided for mounting segment W, with its reflectors RF1 & RF2, and waveguide FD in the proper position and attitude.

Bistatic Receiver

Figure 5:
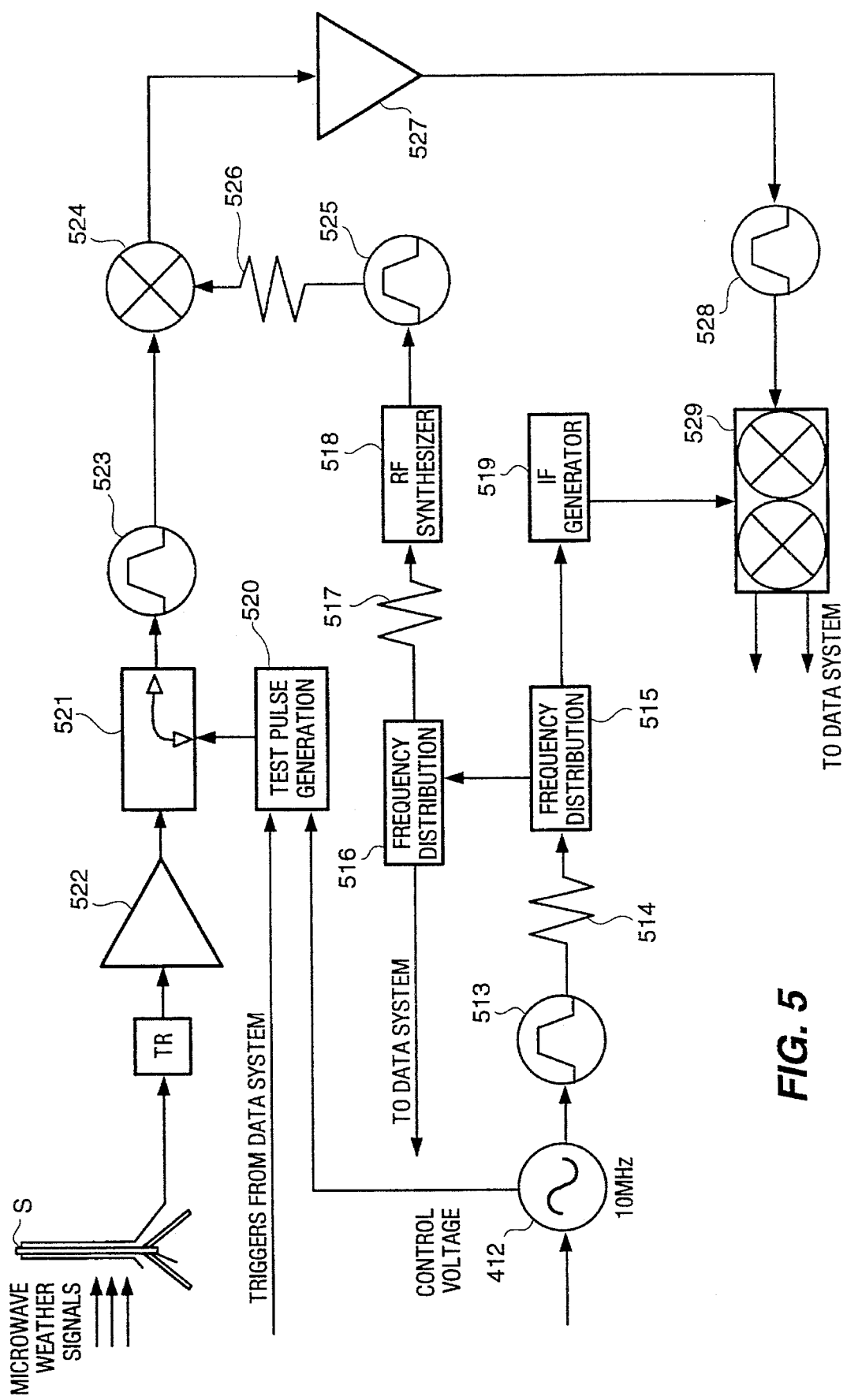
FIG. 5 illustrates in block diagram form the architecture of a bistatic radar receiver.

FIG. 5 illustrates additional details of receiver R. Bistatic receiver 411, details of which are shown in this figure, is connected to a precision frequence reference oscillator 412, such as an ovenized, highly stable 10 MHz voltage controlled oscillator. The output signal from the oscillator 412 is passed through a bandpass filter 513, loss element 514 to frequency distribution circuit 516, which passes one component of the signal to frequency distribution circuit 516. The frequency distribution circuit 515 in conjunction with loss element 517, and RF synthesizer 518 are used to generate frequency locked 15 MHz output frequency, and a synthesized output (in this implementation 2869 MHz) frequencies using circuitry that is analogous to that used in radar transmitter T. Frequency distribution circuit 515, in conjunction with IF generator 519, is used to generate a frequency locked 60 MHz signal. The 10 MHz output from oscillator 412 and a trigger pulse from processor 413 are used by Pulse Generator 520 to produce a test pulse for use for receiver calibration by directional coupler circuit 521. The received signals from antenna S are fed through interface TR designed to block strong signals of amplitude above the damage threshold of amplifier 522. Coupler 521 allows the test signal to be coupled (with low loss) into receiver R. The signal is then sent into bandpass filter 523. The bandpass filter 523 ensures that only the signal components of interest are passed to mixer circuit 524. The 2869 MHz signal output by RF synthesizer 518 is passed through bandpass filter 525, loss element 526 and applied to mixer circuit 524. The 2869 MHz signal is mixed with the received 2809 MHz signal and the resultant 60 MHz signal applied via amplifier 527 and bandpass filter 528 to quadrature detector 529 which outputs signals indicative of the in-phase and quadrature components of the received signal on leads I and Q, respectively.

Transmitter Modifications

There are several methods to coordinate the operation of the transmitter T and receivers R1–R5. One possibility is to place a low gain, precision time base receiver in the vicinity of transmitter T to monitor the frequency of operation of transmitter T. To reduce bandwidth requirements, only the difference from some monimal frequency can be sent. This data is then transmitted to the receivers R1–R5 of the bistatic radar network.

Figure 9:
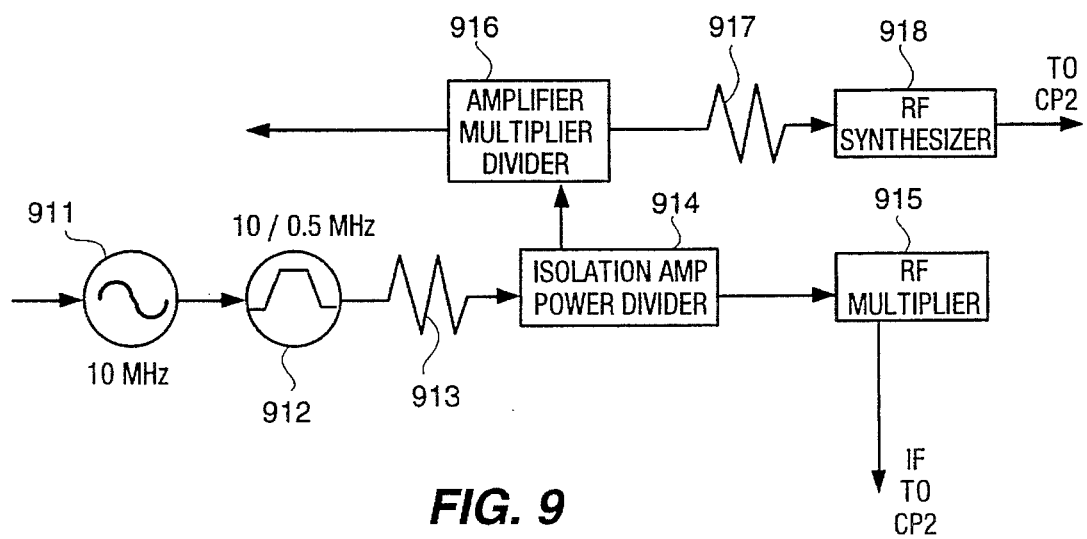
FIG. 9 illustrates modifications made to the radar transmitter.

An alternative method of coordination is to modify an existing radar transmitter T. FIG. 9 illustrates modifications made to a typical radar transmitter, such as the NCAR CP-2 system, that accommodate the requirements of the bistatic radar network. The transceiver incorporates new frequency generation apparatus, a GPS receiver, modem and apparatus that acquires and time tags antenna pointing angle data from the antenna A. FIG. 9 illustrates the new frequency generation apparatus that consists of a highly stable oscillator 911, such as an ovenized highly stable 10 MHz voltage controlled oscillator. A control voltage obtained from processor 423 (FIG. 4 and element 828 on FIG. 8) synchronizes the output frequency of oscillator 911 with the transmitter frequency to generate a base frequency reference for the RF, IF and gating clocks. The clock signal output by oscillator 911 is applied through bandpass filter 912 and loss element 913 to isolation amplifier and power divider circuit 914. One segment of the 10 MHz signal is converted by RF multiplied circuit 915 to a 60 MHz signal which is transmitted to the IF section of the CP-2 radar system. Another segment of the 10 MHz signal is applied to amplifier, multiplier, divider circuit 916 which generates a 15 MHz component which is output to processor 423 and CP-2 radar system. Amplifier, multiplier, divider circuit 916 also outputs a 10 MHz signal through loss element 917 to RF synthesizer 918 which produces a 2869 MHz signal that is transmitted to the CP-2 radar system. The frequency selected represents stable local oscillator (STALO) the operating frequency, 2809 MHz of the existing standard radar transmitter T which is obtained by mixing the 2869 MHz with 60 MHz and selecting the lower sideband for subsequent amplification and pulse gating.

Data Processor

Figure 8:
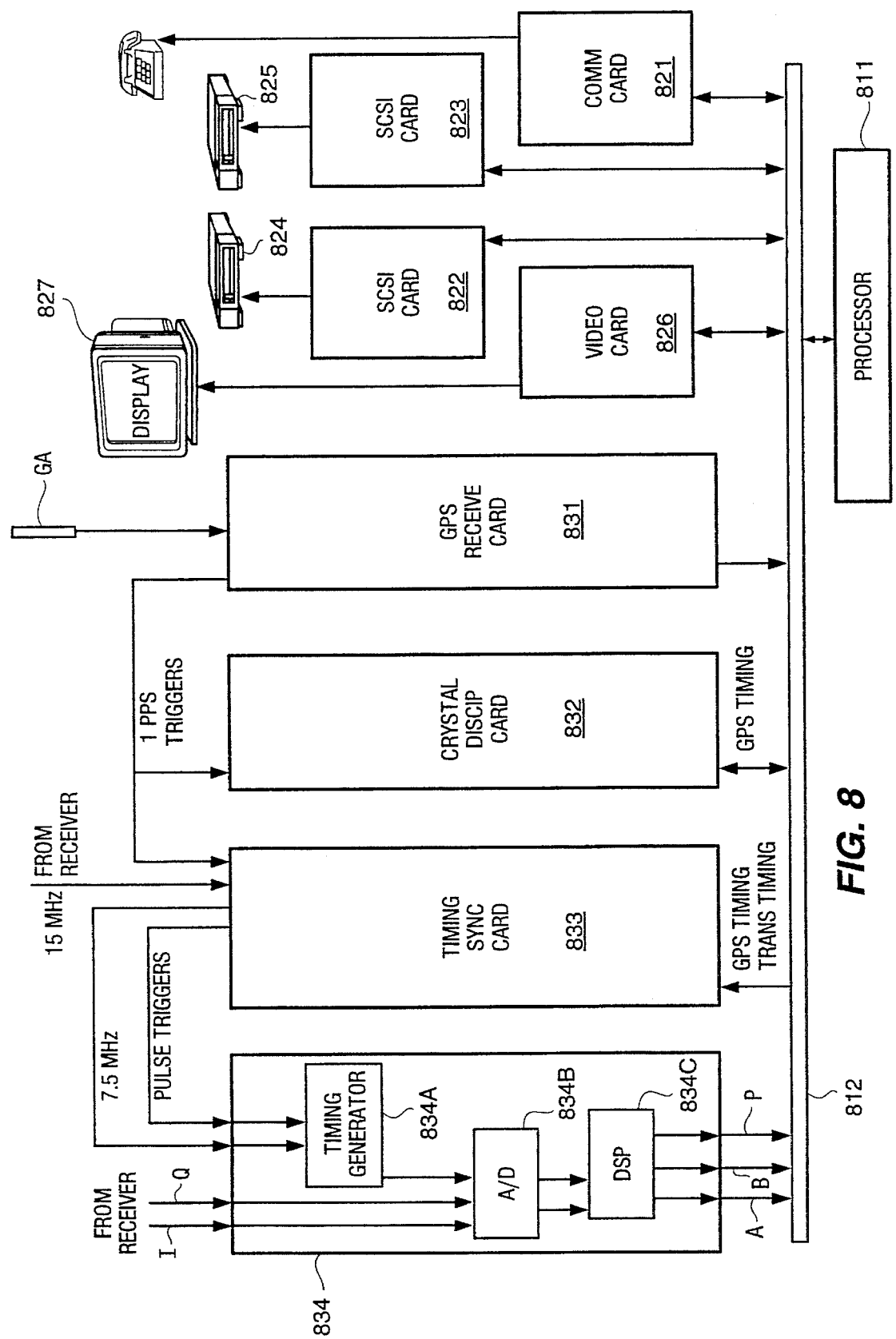
FIG. 8 illustrates in block diagram form the basic architecture of a processing element used in the bistatic network.

FIG. 8 illustrates additional details of the processor structure that is used to convert the received data into meteorological phenomena locus and motion information. To simplify the description, the processor is disclosed as performing the calculations in the distributed processing mode, where processor 413 (FIG. 4) receives the I and Q signals as well as timing signals from bistatic receiver 411 and the GPS signals from GPS antenna GA. Processor 413 is illustrated as embodied in a personal computer that consists of a processing element 811, bus 812 and a plurality of peripheral devices that are connected to bus 812. A communications interface 821 interfaces the bus 812 with a communication link to, for example, transceiver T and central processor 431. Two SCSI interface cards 822, 823 provide memory devices 824, 825, respectively, with an interconnection to bus 812. Video card 826 provides a graphical interface to display 827. The remaining circuitry illustrated in FIG. 8 comprises the timing and gating circuitry that is required for the received radar signal processing. GPS receive card 831 is interconnected with the GPS antenna GA to convert the received GPS signals into timing signals indicative of the time stamped clock signals that are used to synchronize each receiver in the bistatic radar network to the operation of the transmitter T to achieve the timing coherence. The GPS card 831 outputs time signals to bus 812 and 1 pulse per second clock signals to crystal discipline card 832 and timing synchronization card 833. The crystal discipline card 832 reads the GPS time from bus 812 and the 1 pulse per second clock signal from GPS receive card 831 to produce the timing synchronization data required to ensure that oscillator 412 operates in both frequency and timing synchronization with the corresponding oscillator 422 in transmitter T. The timing synchronization card 833 obtains the 1 pulse per second GPS clock signal from the GPS receive card 831, GPS timing data from bus 812, transmitter timing data from bus 812 (obtained via data link D) and the 15 MHz clock signal from bistatic receiver 411 (FIG. 4). Timing synchronization card 833 uses the 15 MHz signal derived from the stable oscillator 412 to produce a 7.5 MHz clock signal that is frequency locked with the 10 MHz output of oscillator 412. The 7.5 clock signals are triggered and gated by a timing gate signal from timing synchronization card 833. These signals are applied to signal converter circuit 834. A timing generator 834a converts these two signals into gating triggers, synchronized with the transmitted radar pulses, which gating triggers are used to input the in-phase and quadrature signals obtained from bistatic receiver 411 into analog to digital converter circuit 834b. The digitized output of analog to digital converter circuit 834b is used by digital signal processor 834c to execute a pulse-pair algorithm that calculates the real and imaginary components (A & B) of the lag one autocorrelations of the in-phase and quadrature (I & Q) signals received from bistatic receiver 411 as well as the power (P) of the received radar echoes. These radar echoes are from obliquely scattered components of the transmitted pulses for each gate of the transmitted beam. The computed values of A, B, P are transmitted via bus 812 to memory devices 824, 825 for storage for later processing using the equations of Appendix B to identify the locus and motion components of the detected meteorological phenomena BS. The stored data is compiled into files for transmission to the central processor 431 which performs the final computations.

Central Processor

Central processor 431 periodically polls all receivers R1–R5 as well as transmitter T to obtain the corresponding radar echoes. The processing of the data from a plurality of receivers pursuant to the equations listed in the Appendices is well-known and not described herein in the interest of brevity of description. The data collection from each of the receivers R1–R5 to central processor 431 can be done on a dial-up telephone basis, dedicated data links or even RF link basis. These represent matters of engineering choice and are best implemented on a site-specific basis.

Transmitter Antenna Pointing-Angle Information

Accurate, time-tagged transmitter antenna pointing-angle information is necessary to calculate the location of scatterers ST in space. A significant characteristic of the bistatic network is that the use of a common timing source G, such as GPS satellites, obviates the need for the exchange of timing synchronization data between transmitter T and the receivers R1–R5 on a pulse-by-pulse basis. The time stamped timing information received from the GPS satellites establishes a time baseline which can be used by each receiver R1–R5 to dynamically compute the pulse origination time of each radar pulse produced by transmitter T, as long as the timing sequence remains invariant and each receiver R1–R5 has data indicative of the pulse timing offset from the baseline timing signals. Thus, transmitter T can broadcast pulse origination time offset data that indicates the origination time of a radar pulse with reference to one of the predetermined baseline timing signals. Each receiver R1–R5 can then use this received data and knowledge of the pulse repetition frequency of transmitter T to extrapolate the pulse origination time for successive pulses output by transmitter T. Similarly, as long as antenna A follows a precisely determined antenna scan pattern, scan pattern origination data can be broadcast to receivers R1–R5 at reduced resolution still enabling these receivers R1–R5 to determine antenna pointing information by extrapolation for each pulse output by transmitter T. Thus, the baseline timing information available from a common timing source enables all the receivers R1–R5 to operate independent of the transmitter T, and yet stay in synchronization with the pulses output by transmitter T. The primary source of errors in this system would be any deviation from the scan pattern or pulse repetition frequency due to transmitter anomalies. The concentration of these error sources in the one manned site enables the system to be efficiently and relatively inexpensively optimized. Furthermore, the addition or deletion of receivers from the bistatic network becomes a matter of simple expediency, since the operationally independent receivers are not intimately linked to transmitter T. Central processor 431 can adjust the processing algorithms to account for the variation in the number of sources of data on a dynamic basis.

SUMMARY

The bistatic network provides a number of improvements over existing weather radar systems. The receivers operate independent of the transmitter by using a common time-tagged signal source. In order to accomplish this there must be a precision common time base. The pulse origination time and antenna pointing angle data can be derived at each receiver by reference to the precision time base and parameter information received from the transmitter. The receivers can be configured into a network in a manner that is substantially independent of the transmitter, and the number of receivers that are presently active can be varied without extensive effort. In addition, the receivers make use of an antenna that has a directional receive pattern and are aligned to monitor at least a segment of the volume scanned by the transmitted radar beam. By selection of the number, sites and receive patterns of the receiver antennas, the precision of the data collection within various regions of the volume of interest can be precisely controlled.

I claim:

1. A radar receiver for determining presence and locus of scatterers in a predefined space, wherein a transmitter transmits a focused beam of high frequency energy into said predefined space in a predetermined scan pattern, with said beam comprising a series of pulses, each having a pulse origination time as it is emanated from said transmitter, and wherein a timing source transmits deterministic timing signals to said radar receiver, apparatus for synchronizing operation of said receiver with said transmitter comprising:

means receiving said deterministic timing signal, means, responsive to pulse origination scheduling data generated in said receiver exclusive of said transmitter, for determining pulse origination times of said pulses emanating from said transmitter; and means, responsive to receipt of components of said transmitted beam that are reflected from scatterers in said predefined space and responsive to said determined pulse origination times, for generating data indicative of locus of said scatterers in said predefined space.

2. The receiver of claim 1 wherein said generating means comprises:

means, responsive to data received from said transmitter that defines said scan pattern, for computing a direction from said transmitter that each pulse in said transmitted beam emanated from said transmitter.

3. The receiver of claim 1 wherein said timing signal emanates from a single signal source whose output is substantially concurrently receivable at said transmitting means and said at least one receiver.

4. The receiver of claim 3 wherein said single signal source is a satellite based transmitter.

5. The receiver of claim 1 wherein said transmitter transmits data to said receiver to indicate a pulse offset time indicative of a time difference between a one of said deterministic timing signals and a pulse origination time of one of said series of pulses, said pulse origination determining means comprises:

means for computing said pulse origination time for each pulse in said series of pulses based on a pulse repetition rate of said series of pulses emanating from said transmitter, said pulse offset time and said deterministic timing signal.

6. The receiver of claim 5 wherein said pulse origination determining means further comprises:

means for regularly retrieving said pulse offset time data from said transmitter.

7. The receiver of claim 1 wherein said apparatus further comprises:

means for producing data, exclusive of said transmitter, indicative of a direction from said transmitter that said transmitted beam emanated.

8. The system of claim 7 further comprising:

means for computing a scatterer locus from said component receipt data and said direction and time of origination data for each of a plurality of pulse time intervals.

9. The system of claim 7 further comprising:

means for computing a scatterer velocity from said component receipt data and said direction and time of origination data from said transmitting means for each of a plurality of pulse time intervals.

10. A Doppler weather radar receiver for determining the locus of meteorological phenomena in a predefined space, wherein a Doppler radar transmitter transmits a focused beam of high frequency energy into said predefined space in a predetermined scan pattern, with said beam comprising a series of pulses, each having a pulse origination time as it is emanated from said transmitter, and wherein a timing source transmits deterministic timing signals to said radar receiver, apparatus for synchronizing operation of said receiver with said transmitter, comprising:

means for receiving said deterministic timing signal to synchronize operation of said receiver with said Doppler radar transmitter;

means, responsive to pulse origination scheduling data, for determining in said receiver exclusive of said transmitter a pulse origination time for said pulses emanating from said transmitter; and means, responsive to receipt of components of said transmitted beam of pulses that are reflected from scatterers comprising features of said meteorological phenomena in said predefined space and responsive to said determined pulse origination time, for generating Doppler radar data indicative of locus of said scatterers in said predefined space wherein said receiver is located at a site remote from said Doppler radar transmitter.

11. The system of claim 10 further comprising:

means for producing azimuth and elevation data indicative of a direction from said Doppler radar transmitter that said transmitted beam emanated.

12. The system of claim 11 further comprising:

means for computing a scatterer locus from said component receipt data and said direction and time of origination data for each of a plurality of pulse time intervals.

13. The system of claim 11 further comprising:

means for computing a scatterer velocity from said component receipt data and said direction and time of origination data from said transmitting means for each of a plurality of pulse time intervals.

14. The receiver of claim 10 wherein said generating means further comprises:

means, responsive to information stored in a memory in said receiver that defines said transmitter beam scan pattern, for computing a direction from said Doppler radar transmitter that each pulse in said transmitted beam emanated from said Doppler radar transmitter.

15. The system of claim 10 wherein said timing signal emanates from a single signal source whose output is substantially concurrently receivable at said Doppler radar transmitter and said receiver.

16. The system of claim 15 wherein said single signal source is a satellite based transmitter.

* * * * *